United States Patent
Pon et al.

(10) Patent No.: US 7,817,084 B2
(45) Date of Patent: Oct. 19, 2010

(54) SYSTEM AND/OR METHOD FOR REDUCING AMBIGUITIES IN RECEIVED SPS SIGNALS

(75) Inventors: Rayman Wai Pon, Cupertino, CA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 11/842,759

(22) Filed: Aug. 21, 2007

(65) Prior Publication Data

US 2008/0079633 A1 Apr. 3, 2008

Related U.S. Application Data

(60) Provisional application No. 60/839,854, filed on Aug. 23, 2006.

(51) Int. Cl.
*G01S 19/33* (2010.01)
*G01S 19/30* (2010.01)

(52) U.S. Cl. .............................. 342/357.12; 342/357.69
(58) Field of Classification Search ............ 342/357.12, 342/357.15
See application file for complete search history.

(56) References Cited

U.S. PATENT DOCUMENTS

| | | | | |
|---|---|---|---|---|
| 6,075,987 A * | 6/2000 | Camp et al. | ............. | 342/357.12 |
| 6,295,023 B1 * | 9/2001 | Bloebaum | .............. | 342/357.06 |
| 6,363,123 B1 * | 3/2002 | Balodis | ................. | 342/357.06 |
| 2001/0033627 A1 * | 10/2001 | Syrjarinne | ................... | 375/354 |
| 2006/0140254 A1 * | 6/2006 | Pietila et al. | ................. | 375/147 |
| 2008/0048910 A1 * | 2/2008 | Wang et al. | ............. | 342/357.15 |
| 2008/0117103 A1 * | 5/2008 | Wang et al. | ............. | 342/357.15 |

FOREIGN PATENT DOCUMENTS

| | | |
|---|---|---|
| EP | 1146349 | 10/2001 |
| WO | 9944073 | 9/1999 |
| WO | 0153849 | 7/2001 |
| WO | 2004063763 | 7/2004 |

OTHER PUBLICATIONS

R.T. Ioannides, Coherent Integration of Future GNSS Signals, ION GNSS 2006.*
International Search Report—PCT/US07/076690, International Search Authority, European Patent Office—Mar. 10, 2008.
Written Opinion-PCT/US07/076690, International Search Authority, European Patent Office-Mar. 10, 2008.
International Preliminary Report on Patentability-PCT/US07/076690-International Search Authority WIPO Geneva-Feb. 24, 2009.
Ioannides, R.T., Coherent Integration of Future GNSS signal, ION GNSS 2006.

* cited by examiner

*Primary Examiner*—Thomas H Tarcza
*Assistant Examiner*—Fred H Mull
(74) *Attorney, Agent, or Firm*—Jimmy Cheng

(57) ABSTRACT

Systems, apparatuses, and/or methods for resolving ambiguities associated with signals received from space vehicles (SVs) in a satellite navigation system. For example, certain methods include receiving a first SV signal from a first satellite positioning system (SPS), and reducing a bit edge ambiguity of a data signal modulating a second SV signal received from a second SPS based, at least in part, on information in the received first SV signal.

44 Claims, 15 Drawing Sheets

SYSTEM AND/OR METHOD FOR REDUCING AMBIGUITIES IN RECEIVED SPS SIGNALS

BACKGROUND

1. Field

The subject matter disclosed herein relates to determining a location based upon signals received from geo-location satellites.

2. Information

A satellite positioning system (SPS) typically comprises a system of earth orbiting satellites enabling entities to determine their location on the earth based, at least in part, on signals received from the satellites. Such an SPS satellite typically transmits a signal marked with a repeating pseudo-random noise (PN) code of a set number of chips. For example, a satellite in a constellation of a Global Navigation Satellite System (GNSS) such as GPS or Galileo may transmit a signal marked with a PN code that is distinguishable from PN codes transmitted by other satellites in the constellation.

To estimate a location at a receiver, a navigation system may determine pseudorange measurements to satellites "in view" of the receiver using well known techniques based, at least in part, on detections of PN codes in signals received from the satellites. Such a pseudorange to a satellite may be determined based, at least in part, on a code phase detected in a received signal marked with a PN code associated with the satellite during a process of acquiring the received signal at a receiver. To acquire the received signal, a navigation system typically correlates the received signal with a locally generated PN code associated with a satellite. For example, such a navigation system typically correlates such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from a GNSS satellite, a receiver may form multiple pseudorange hypotheses. Using additional information, a receiver may eliminate such pseudorange hypotheses to, in effect, reduce an ambiguity associated with a true pseudorange measurement. In addition to being encoded with a periodically repeating PN code sequence, a signal transmitted by a GNSS satellite may also be modulated by additional information such as, for example, a data signal and/or a known sequence of values. By detecting such additional information in a signal received from a GNSS satellite, a receiver may eliminate pseudorange hypotheses associated with the received signal.

FIG. 1A illustrates an application of an SPS system, whereby a subscriber station 100 in a wireless communications system receives transmissions from satellites 102a, 102b, 102c, 102d in the line of sight to subscriber station 100, and derives time measurements from four or more of the transmissions. Subscriber station 100 may provide such measurements to position determination entity (PDE) 104, which determines the position of the station from the measurements. Alternatively, the subscriber station 100 may determine its own position from this information.

Subscriber station 100 may search for a transmission from a particular satellite by correlating the PN code for the satellite with a received signal. The received signal typically comprises a composite of transmissions from one or more satellites within a line of sight to a receiver at station 100 in the presence of noise. A correlation may be performed over a range of code phase hypotheses known as the code phase search window $W_{CP}$, and over a range of Doppler frequency hypotheses known as the Doppler search window $W_{DOPP}$. As pointed out above, such code phase hypotheses are typically represented as a range of PN code shifts. Also, Doppler frequency hypotheses are typically represented as Doppler frequency bins.

A correlation is typically performed over an integration time "I" which may be expressed as the product of $N_c$ and M, where $N_c$ is the coherent integration time, and M is the number of coherent integrations which are non-coherently combined. For a particular PN code, correlation values are typically associated with corresponding PN code shifts and Doppler bins to define a two-dimensional correlation function. Peaks of the correlation function are located and compared to a predetermined noise threshold. The threshold is typically selected so that the false alarm probability, the probability of falsely detecting a satellite transmission, is at or below a predetermined value. A time measurement for the satellite is typically derived from a location of an earliest non-side lobe peak along the code phase dimension which equals or exceeds the threshold. A Doppler measurement for the subscriber station may be derived from the location of the earliest non-side lobe peak along the Doppler frequency dimension which equals or exceeds the threshold.

Resolving ambiguities of pseudorange hypotheses associated with acquired GNSS signals consumes power and processing resources. Such consumption of power and processing resources are typically critical design constraints in portable products such as mobile phones and other devices.

BRIEF DESCRIPTION OF THE FIGURES

Non-limiting and non-exhaustive features will be described with reference to the following figures, wherein like reference numerals refer to like parts throughout the various figures

SUMMARY

Figure 1A:
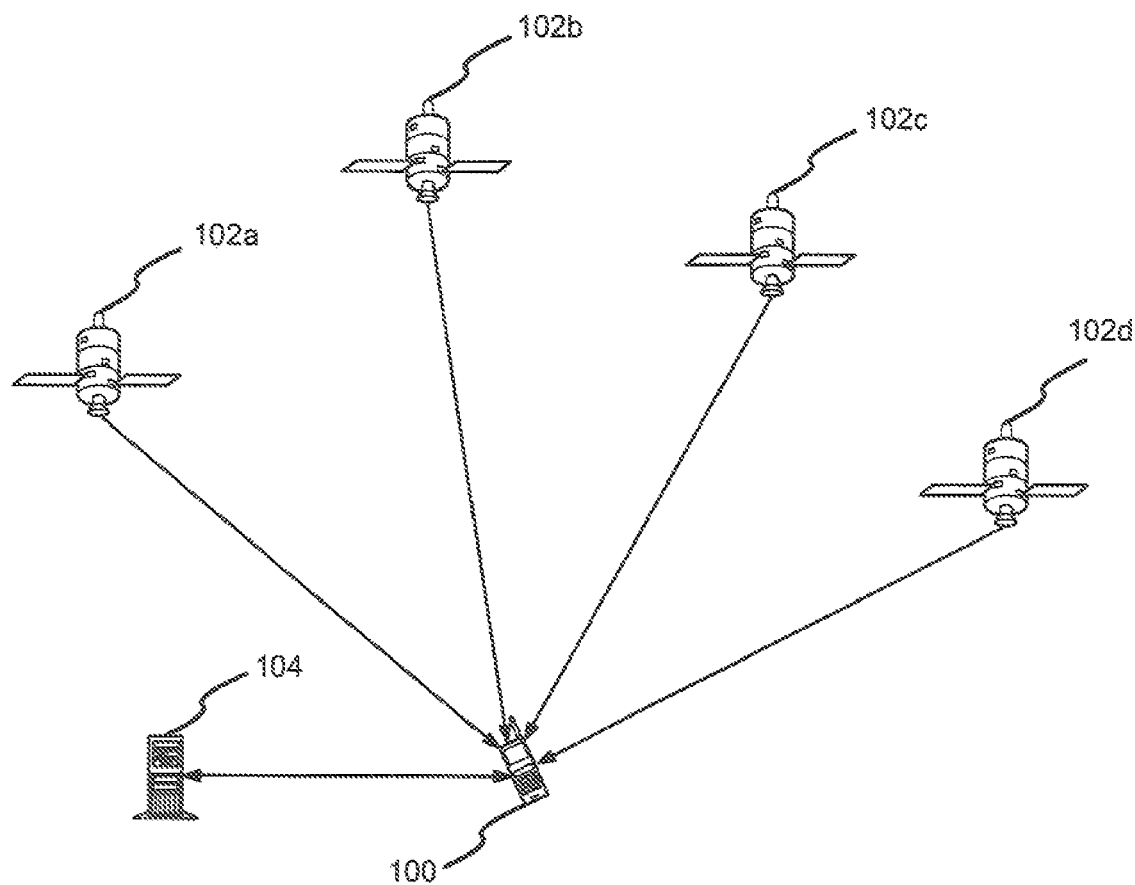
FIG. 1A is a schematic diagram of a satellite positioning system (SPS) according to one aspect.

In one aspect, a first SPS signal received at a receiver from a first SV is modulated by a data signal. In one particular feature illustrated herein, a system and method are directed to reducing an ambiguity of a bit edge in the data signals based, at least in part, on information in a second SPS signal received at the receiver. It should be understood, however, that this is merely one particular feature according to a particular example illustrated herein and that claimed subject matter is not limited in this respect.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "reducing," "associating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, process described herein, with reference to flow diagrams or otherwise, may also be executed and/or controlled, in whole or in part, by such a computing platform.

A "space vehicle" (SV) as referred to herein relate to an object that is capable of transmitting signals to receivers on the earth's surface. In one particular example, such an SV may comprise a geostationary satellite. Alternatively, an SV may comprise a satellite traveling in an orbit and moving relative to a stationary position on the earth. However, these are merely examples of SVs and claimed subject matter is not limited in these respects.

A "location" as referred to herein relates to information associated with a whereabouts of an object or thing according to a point of reference. Here, for example, such a location may be represented as geographic coordinates such as latitude and longitude. In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular examples and claimed subject matter is not limited in these respects.

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA)

network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an example, a device and/or system may estimate its location based, at least in part, on signals received from SVs. In particular, such a device and/or system may obtain "pseudorange" measurements comprising approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SVs' orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS', and that claimed subject matter is not limited in this respect.

Techniques described herein may be used with any one of several SPS, including the aforementioned SPS', for example. Furthermore, such techniques may be used with positioning determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with GPS time. Such a transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

A "Global Navigation Satellite System" (GNSS) as referred to herein relates to an SPS comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. An SV which is a member of a particular GNSS constellation typically transmits navigation signals in a format that is unique to the particular GNSS format. Accordingly, techniques for acquiring a navigation signal transmitted by an SV in a first GNSS may be altered for acquiring a navigation signal transmitted by an SV in a second GNSS. In a particular example, although claimed subject matter is not limited in this respect, it should be understood that GPS, Galileo and Glonass each represent a GNSS which is distinct from the other two named SPS'. However, these are merely examples of SPS' associated with distinct GNSS' and claimed subject matter is not limited in this respect.

According to one feature, a navigation receiver may obtain a pseudorange measurement to a particular SV based, at least in part, on an acquisition of a signal from the particular SV which is encoded with a periodically repeating PN code sequence. Acquisition of such a signal may comprise detecting a "code phase" which is referenced to time and an associated point in the PN code sequence. In one particular feature, for example, such a code phase may be referenced to a locally generated clock signal and a particular chip in the PN code sequence. However, this is merely an example of how a code phase may be represented and claimed subject matter is not limited in this respect.

According to an example, detection of a code phase may provide several ambiguous candidate psuedoranges or pseudorange hypotheses at PN code intervals. Accordingly, a navigation receiver may obtain a pseudorange measurement to the SV based, at least in part, upon the detected code phase and a resolution of ambiguities to select one of the pseudorange hypotheses as a "true" pseudorange measurement to the SV. As pointed out above, a navigation receiver may estimate its location based, at least in part, on pseudorange measurements obtained from multiple SVs.

According to an example, although claimed subject matter is not limited in this respect, a signal transmitted from an SV may be modulated with one or more data signals over predetermined periods and in a predetermined sequence. In a GPS signal format, for example, an SV may transmit a signal which is encoded with a known PN code sequence that repeats on millisecond intervals. In addition, such a signal may be modulated with a data signal that may change on predetermined 20 ms intervals, for example. According to a particular example, although claimed subject matter is not limited in this respect, such a data signal and repeating PN code sequence may be combined in modulo 2 sum operation prior to being mixed by a radio frequency carrier signal for transmission from an SV.

Figure 1B:
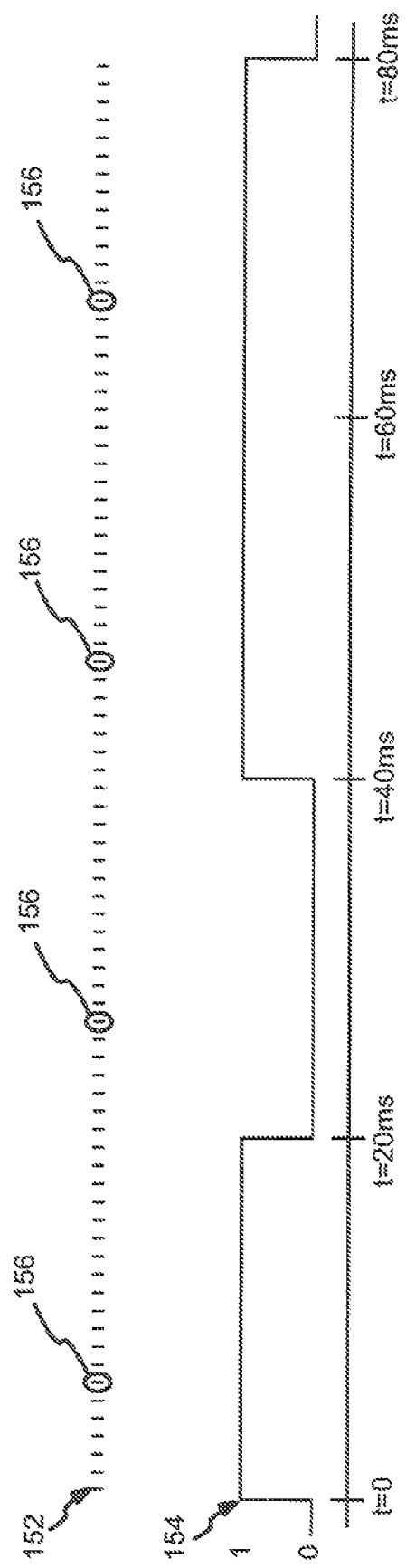
FIG. 1B is a timing diagram illustrating pseudorange hypotheses of a received GNSS signal according to one aspect.

FIG. 1B is a timing diagram illustrating pseudorange hypotheses 152 superimposed on a data signal 154 in a signal received at a reference location from an SV in a GPS constellation according to an example. Here, a bit interval in data signal 154 may be 20 ms long and extend over twenty pseudorange hypotheses 152 which are determined, at least in part, on a detection of a code phase in a repeating 1.0 ms PN code sequence. By selection of one of the pseudorange hypotheses 156 within a 20 msec bit interval, a receiver may determine boundaries between 20 ms data bit intervals or "bit edges" partitioning sequential bits in data signal 154.

According to an example, although claimed subject matter is not limited in this respect, a receiver may detect a bit edge and/or boundary between bit intervals in a data signal modulating a signal received from one SV based, at least in part, on a signal received from another SV. Here, pseudorange hypotheses of a first signal may be associated with pseudorange hypotheses of a second signal. Based, at least in part, on such an association between pseudorange hypotheses of a first signal and pseudorange hypotheses of a second signal, a receiver may resolve ambiguities in an alignment and/or phase of a bit edge in a modulated signal with respect to a true pseudorange. However, this is merely an example and claimed subject matter is not limited in this respect.

Figure 2:
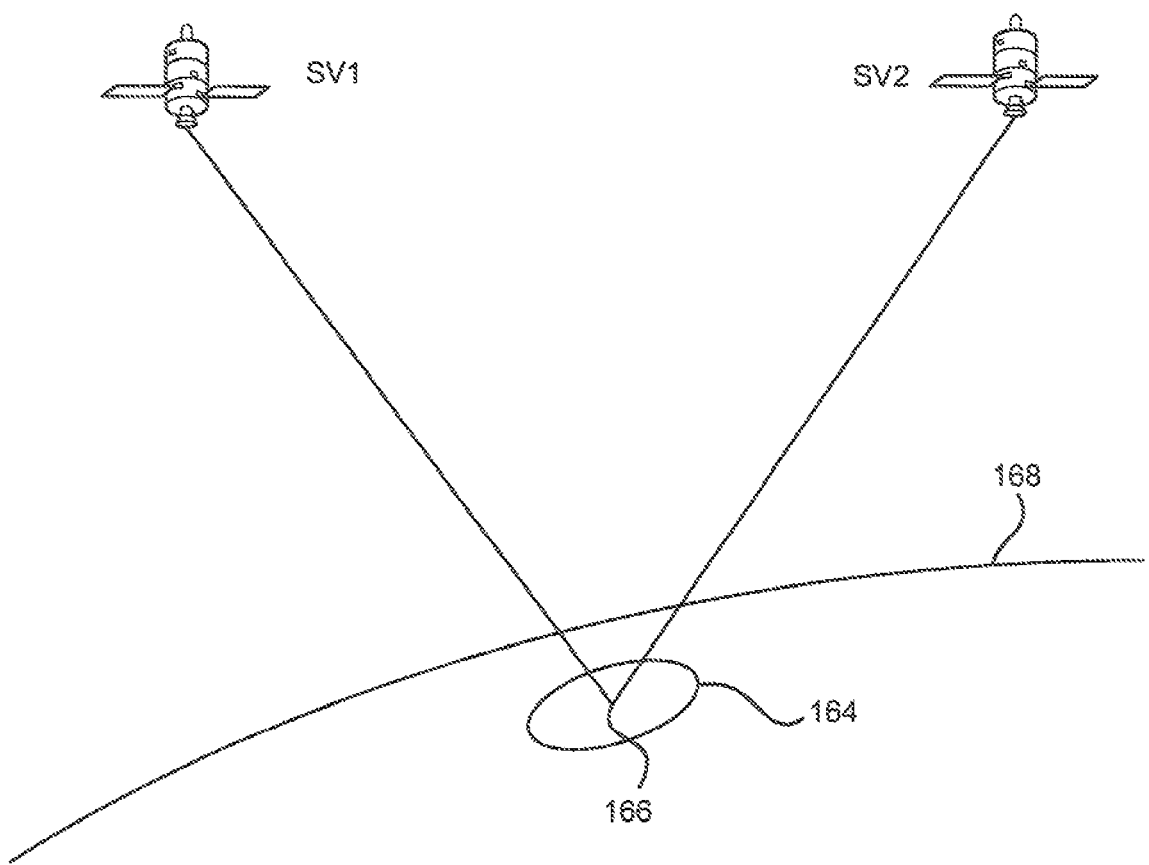
FIG. 2 shows a schematic diagram of a system that is capable of determining a location at a receiver by measuring pseudoranges to space vehicles (SVs) according to one aspect.

FIG. 2 shows a schematic diagram of a system that is capable of determining a location at a receiver by measuring pseudoranges to SVs according to an example. A receiver at a reference location center 166 on the Earth's surface 168 can view and receive signals from SV1 and SV2. Reference location center 166 may be known to be within reference location region 164 defined by, for example, a circle of a radius of about 10 km. It should be understood, however, that this is merely an example of how an uncertainty of an estimated location may be represented according to a particular aspect and claimed subject matter is not limited in this respect. In one example, region 164 may comprise a coverage area of a particular cell of a cellular wireless communication network at a known location.

According to an example, a receiver at reference location region 164 may communicate with other devices such as, for example, a server (not shown) over a wireless communication link in, for example, a satellite communication network or terrestrial wireless communication network. In one particular example, such a server may transmit acquisition assistance (AA) messages to the receiver comprising information used by a receiver to process signals received from SVs and/or obtain pseudorange measurements. Alternatively, such AA messages may be provided from information locally stored in a memory of the receiver. Here, such locally stored information may be stored to the local memory from a removable memory device and/or derived from previous AA message received from a server, just to name a few examples. In a particular example, AA messages may comprise information such as, for example, information indicative of locations of SV1 and SV2, an estimate of the location of reference location center 166, uncertainty associated with estimated location, an estimate of current time and/or the like. Such information indicative of positions of SV1 and SV2 may comprise ephemeris information and/or almanac information. As pointed out below according to particular examples, a receiver may estimate positions of SV1 and SV2 based, at least in part, on such ephemeris and/or almanac and a rough estimate of time. Such an estimated position of an SV may comprise, for example, an estimated azimuth angle from a reference direction and an elevation angle from the Earth's horizon at reference location center 166 and/or earth-centered XYZ coordinates.

According to an example, SV1 and SV2 may be members of the same or different GNSS constellations. In particular examples illustrated below, SV1 may be a member of a GPS constellation while SV2 may be a member of a Galileo constellation. It should be understood, however, that this is merely an example of how a receiver may receive signals from SVs belonging to different GNSS constellations and claimed subject matter is not limited in this respect.

Figure 3:
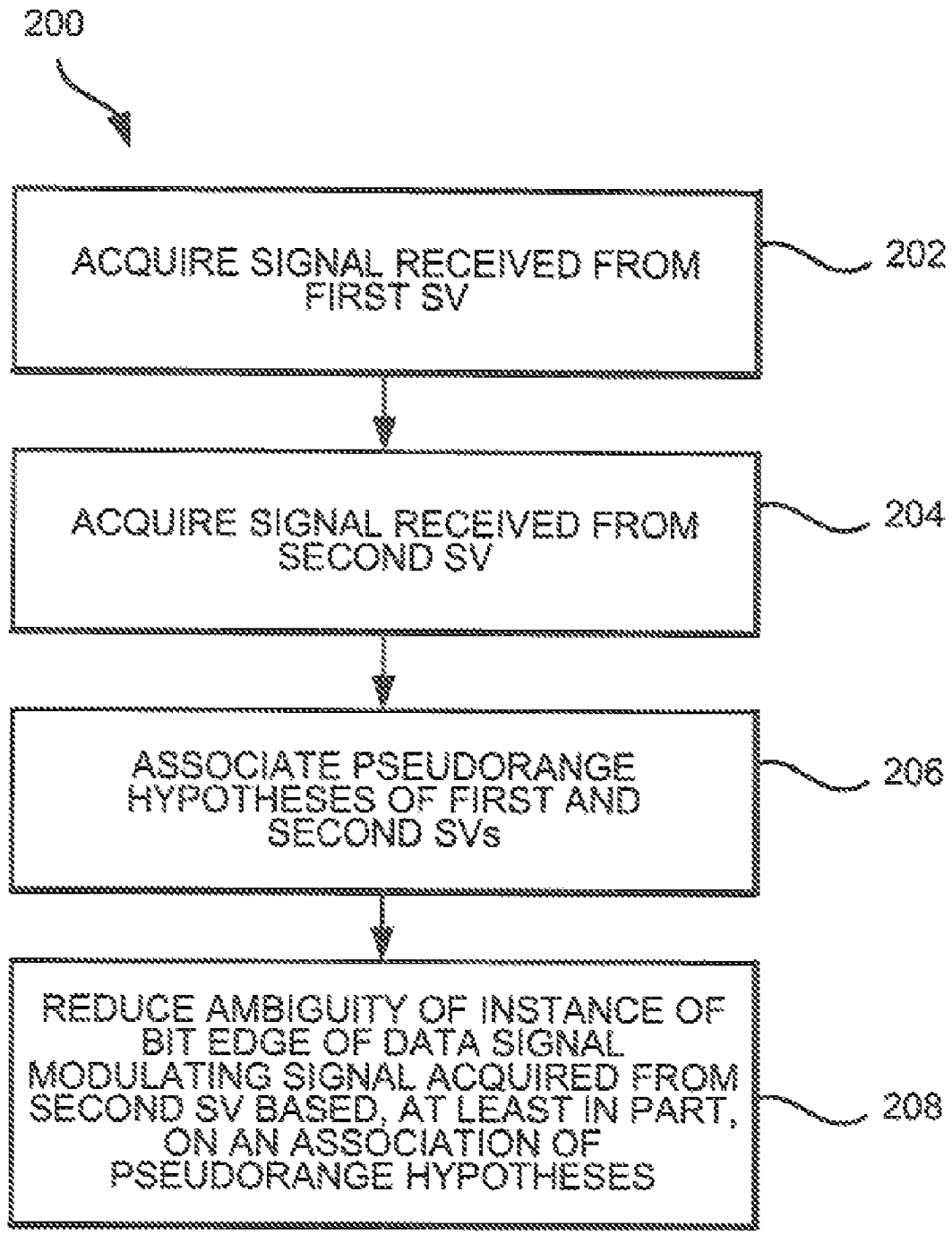
FIG. 3 is a flow diagram illustrating a process for reducing ambiguities in a signal acquired from an SV according to one aspect.

FIG. 3 is a flow diagram of a process 200 for reducing ambiguities in a signal received from an SV according to an example. Here, a receiver at a reference location region may receive a first signal encoded with a first periodically repeating PN code from a first SV (e.g., SV1) and receive a second signal encoded with a second periodically repeating PN code from a second SV (e.g., SV2). To acquire the first signal at block 202, such a receiver may detect a Doppler frequency and code phase in the received signal. Such a detection of a code phase may comprise, for example, a correlation of code and/or time-shifted versions of a locally generated code sequence with the received first signal as illustrated below. In one example where the received signal is transmitted from a Galileo SV, for example, such a code phase may be detected within a 4.0 ms repeating period of a PN code sequence. Alternatively, where the received signal is transmitted from a GPS SV, such a code phase may be detected within a 1.0 ms repeating period of a PN code sequence. However, this is merely an example of how a signal from an SV of a particular GNSS may be acquired, and claimed subject matter is not limited in this respect.

In one particular alternative, first and second SVs may be from a GPS constellation while at least one of the two SVs is capable of transmitting an L1C signal. Like a navigation signal from a Galileo SV, an L1C navigation signal may comprise a signal encoded with a 4.0 ms periodically repeating PN code sequence. Accordingly, it should be understood that while particular examples discussed herein may relate to the use of SVs from Galileo and GPS constellations, such techniques may also apply to other examples employing two GPS SVs where at least one of the SVs is capable of transmitting an L1C signal. Again, these are merely examples of particular signals that may be received from an SPS at a receiver at a reference location region and claimed subject matter is not limited in this respect.

Block 204 may acquire the second signal received from the second SV using techniques discussed above in connection with block 202. It should be understood, however, that the second signal received may be transmitted according to a GNSS format that is different from that of the GNSS format used for transmitting the first signal. Here, for example, the first received signal may be transmitted from an SV in a GPS constellation while the second received signal may be transmitted from an SV in a Galileo constellation. Alternatively, the first received signal may be transmitted from an SV in a Galileo constellation while the second received signal may be transmitted from a GPS constellation. It should be understood, however, that these are merely examples of how a receiver may receive signals from SVs belonging to constellations of different GNSS', and claimed subject matter is not limited in this respect.

Upon acquisition of signal from an SV (e.g., as illustrated above with reference to blocks 202 and 204), a receiver may determine pseudorange hypotheses from code phase detections. In a particular example where an SV transmits a signal according to a GPS format, for example, a receiver may determine pseudorange hypotheses at 1.0 ms intervals and/or at increments of about $3.0 \times 10^5$ meters based, at least in part, on a phase of a periodically repeating PN code sequence detected in a signal acquired at a receiver. In another example where an SV transmits a signal according to a Galileo format, for example, pseudorange hypotheses may be determined at 4.0 ms intervals and/or at increments of about $1.2 \times 10^6$ meters based, at least in part, on a phase of a periodically repeating PN code sequence detected in a signal acquired at a receiver. In detecting a phase of a PN code sequence in a signal transmitted by an SV, a receiver may employ, for example, information provided to a receiver in an AA message. However, this is merely an example of how a receiver may detect a phase of a periodic PN code sequence of a signal transmitted from an SV and claimed subject matter is not limited in this respect.

Figure 4:
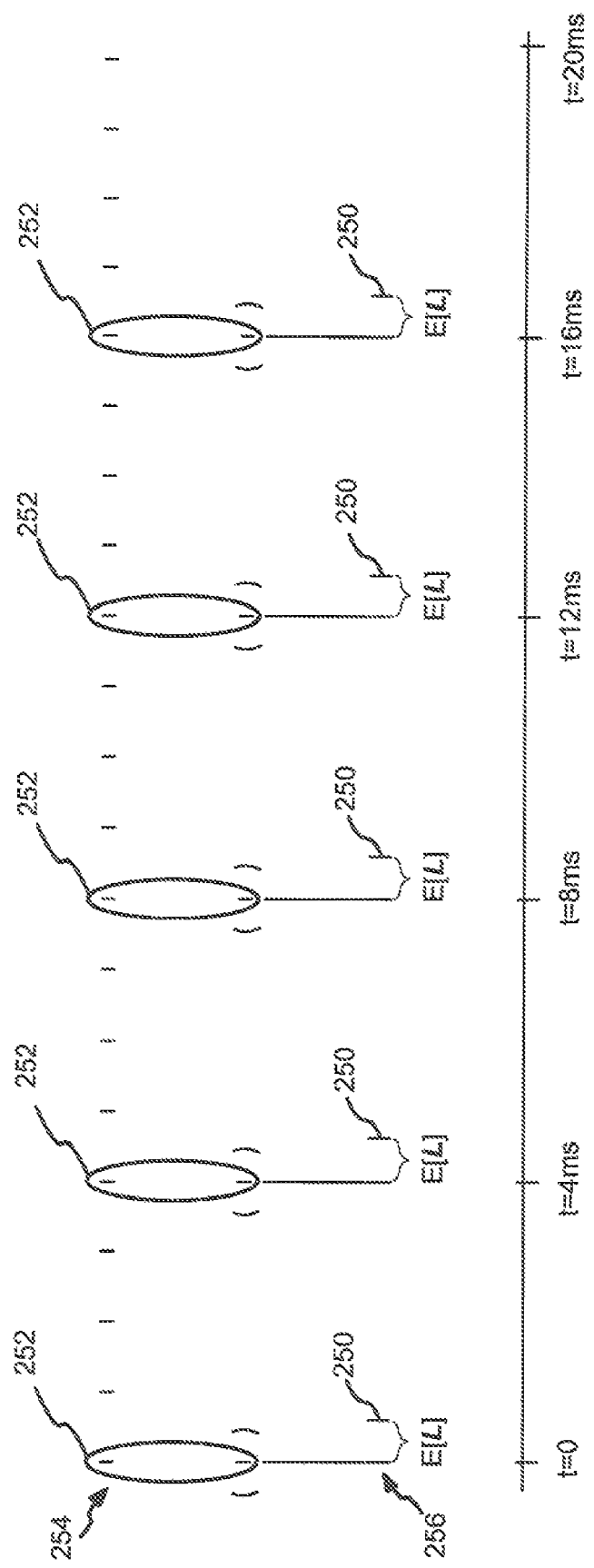
FIG. 4 is a timing diagram illustrating an association of pseudorange hypotheses derived from signals acquired from different SVs according to one aspect.

According to an example, block 206 may associate pseudorange hypotheses of a signal received from a first SV (SV1)

with pseudorange hypotheses of a signal received from a second SV (SV2). As illustrated in FIG. 4 according to a particular example, pseudorange hypotheses 254 of a signal received at a reference location region from a first SV in a GPS constellation are associated with pseudorange hypotheses 256 of a signal received at the reference location region from a second SV in a Galileo constellation based, at least in part, on an estimated difference between a range to the first SV from the reference location center and a range to the second SV from the reference location center. Here, it should be observed that a range from the reference location to the first SV may be different from a range from the reference location to the second SV. In a particular example, information provided to a receiver (e.g., at reference location region 164) in an AA message, may be used for estimating such a difference in ranges to the first and second SVs from the reference location center.

An actual difference L may define a difference (in units of time, for example) between a range to the first SV from the reference location and a range to the second SV from the reference location. Here, the actual difference L may be expressed as follows:

$$L = T_2 - T_1$$

where:
$T_1$=propagation delay of signal from SV1 as measured at reference location at a given time; and
$T_2$=propagation delay of signal from SV2 as measured at reference location at same given time.

To associate pseudorange hypotheses 254 with pseudorange hypotheses 256, accordingly, a receiver may determine an estimate of a difference L (in units of time, for example) between a range to the first SV from the reference location center and a range to the second SV from the reference location center according to relation (1) as follows:

$$E[L] = E[T_2 - T_1] \quad (1)$$

As errors associated with measurements of $T_2$ and $T_1$ may be presumed to be substantially independent, the expression $E[T_2-T_1]$ may be approximated by the expression $E[T_2]-E[T_1]$. Here, in a particular example, a value for the expression $E[T_2]-E[T_1]$ may be known and/or available to a receiver through an AA message for a particular time. Alternatively, a receiver may derive such a value for the expression $E[T_2]-E[T_1]$ for a particular time from information received in such an AA message.

An estimate of difference L, E[L], applied to associated pseudorange hypotheses 254 from 256 according to relation (1) may be reduced to an expression that cancels receiver clock error τ as follows:

$$E[L] = E[T_2] - E[T_1]$$
$$= (R_{SV2}/c - \tau) - (R_{SV1}/c - \tau)$$
$$= (R_{SV2} - R_{SV1})/c$$

where:
c=speed of light;
τ=receiver clock bias error;
$R_{SV1}$=estimate of range to SV1 from reference location center; and
$R_{SV2}$=estimate of range to SV2 from reference location center.

Here, it should be observed that a value for difference estimate E[L] may be expressed in units of either linear length or time, and that conversion between units of such an expression for the value of E[L] may be provided by the speed of light expressed in the appropriate units. According, it should be understood that such a value for difference estimate E[L] may expressed interchangeably in either units of time or linear length without deviating from claimed subject matter.

According to an example, block 206 may compute an estimate difference between a range from reference location center 166 to SV1 ("$R_{SV1}$") and a range from reference location center 166 to SV2 ("$R_{SV2}$"). Here, block 206 may obtain AA information from one or more AA messages indicating, for example, estimates of locations of SV1 and SV2 in earth-centered XYZ coordinates in addition to an estimate of earth-centered XYZ coordinates for reference location center 166. Using such earth-centered XYZ coordinates, block 206 may compute Euclidean distances for $R_{SV1}$ and $R_{SV2}$.

FIG. 4 is a timing diagram illustrating an association of pseudorange hypotheses over a 20 ms duration beginning at t=0 and ending at t=20 ms, as illustrated by a horizontal timeline marked at 0 ms, 4 ms, 8 ms, 12 ms, 16 ms, and 20 ms. In this particular example, accordingly, a bit edge of a data signal modulating a GPS signal may occur at some instance between t=0 and t=20 ms. Here, pseudorange hypotheses 254, derived from a signal received at a reference location region from a GPS SV, for example, may be determined at increments of 1.0 ms, e.g., as illustrated by a row of small vertical tic marks shown with increments of 1.0 ms extending parallel to the timeline and beginning in this example at t=0 ms, and wherein every fourth tic mark represents a pseudorange hypotheses 252 as shown within an oval. Here, pseudorange hypotheses 256, derived from a signal received at a reference location region from a Galileo SV, for example, may be determined at increments of 4.0 ms, e.g., as illustrated by another row of small vertical tic marks (labeled pseudorange hypotheses 250) extending parallel to the timeline and beginning in this example offset slightly from t=0 ms with increments of 4.0 ms. It should be understood that in particular examples illustrated with reference to FIG. 4, and with reference to FIGS. 5A through 6C, a Galileo signal transmitted from the first SV may be synchronized with a data signal modulating the GPS signal received from the second SV. As described in greater detail below, in an example, a particular pseudorange hypotheses 250 of pseudorange hypotheses 256 may be uniquely associated with a particular pseudorange hypotheses 252 of pseudorange hypotheses 254 by difference estimate E[L] as determined above in relation (1), e.g., as illustrated in FIG. 4 by the longer vertical lines extending perpendicular to the timeline from within the ovals to the row of small vertical tic marks (labeled pseudorange hypotheses 250).

According to an example, although claimed subject matter is not limited in this respect, accuracy of difference estimate E[L] is based, at least in part, on an amount or degree of uncertainty associated with an estimate of the reference location region (e.g., as expressed in XYZ earth-centered coordinates). In FIG. 4, a value for difference estimate E[L] is shown to be about 0.6 ms with a single-sided of uncertainty of less than 0.5 ms. Accordingly, a pseudorange hypothesis 250 uniquely associates with a pseudorange hypothesis 252 that is separated from the pseudorange hypotheses 250 by 0.6 +/− 0.5 ms. Accordingly, if difference estimate E[L] is known to be accurate to within 0.5 ms, particular pseudorange hypotheses 252 from among pseudorange hypotheses 254 may be associated with particular single pseudorange hypothesis 250 as illustrated in FIG. 4. Here, at block 208, in FIG. 3, remaining unassociated pseudorange hypotheses 254 (e.g., in FIG. 4, the tic marks that are not illustrated within ovals) may be eliminated as hypotheses for determining a phase and/or alignment of a bit edge of the GPS data signal relative to a true pseudorange within a data bit interval. As illustrated in FIG. 4 according to a particular example, of twenty pseudorange hypotheses 254, five pseudorange hypotheses 252 (e.g., the tic marks that are illustrated within ovals) associated with pseudorange hypotheses 250 remain. Accordingly, rather than processing twenty pseudorange hypotheses for detecting a phase and/or alignment of a bit edge relative to a true pseudorange, only the five remaining pseudorange hypotheses 252 need be processed using, for example, a likelihood function applied to correlation metrics associated with the five remaining pseudorange hypotheses 252. Here, by increasing a separation of adjacent pseudorange hypotheses from 1.0 ms to 4.0 ms, such a likelihood function may resolve such an ambiguity among the five remaining pseudorange hypotheses 252 faster and/or using less processing resources or with lower input signal strength.

In the example illustrated above in FIG. 4, a single-sided uncertainty of less than 0.5 msec in the difference estimate E[L] allows for an association of a pseudorange hypothesis 250 with a single pseudorange hypothesis 252. In other examples, however, such a single-sided uncertainty of 0.5 msec in the difference estimate E[L] may exceed 0.5 msec, resulting in an association of two or more pseudorange hypotheses. Here, such a likelihood function may also be applied for resolving these additional ambiguities.

In an alternative example, a receiver may eliminate pseudorange hypotheses for detecting a phase and/or alignment of a bit edge in an acquired GPS signal by decoding a pilot channel on a Galileo signal. Here, such a pilot channel of a Galileo signal may be encoded with a known data sequence that repeats on 100 ms periods where a 100 ms data sequence overlaps twenty-five consecutive 4.0 msec epochs and/or repeating PN code sequences. Detection of a code phase in a 4.0 ms PN code sequence in acquisition of a Galileo signal may provide twenty five hypotheses for an alignment of the 100 ms data sequence with respect to a true pseudorange. To select among the twenty-five hypotheses, a receiver may determine a phase alignment of the 100 ms data sequence by sequentially correlating up to twenty-five possible 4.0 ms shifts of at least a portion of the 100 ms data sequence with the received Galileo signal until the result exceeds a predetermined threshold, for example. When the result exceeds the predetermined threshold, the receiver may select an associated alignment of the detected code phase relative to the 100 ms data sequence from among the twenty-five alignment hypotheses.

Figure 5A:
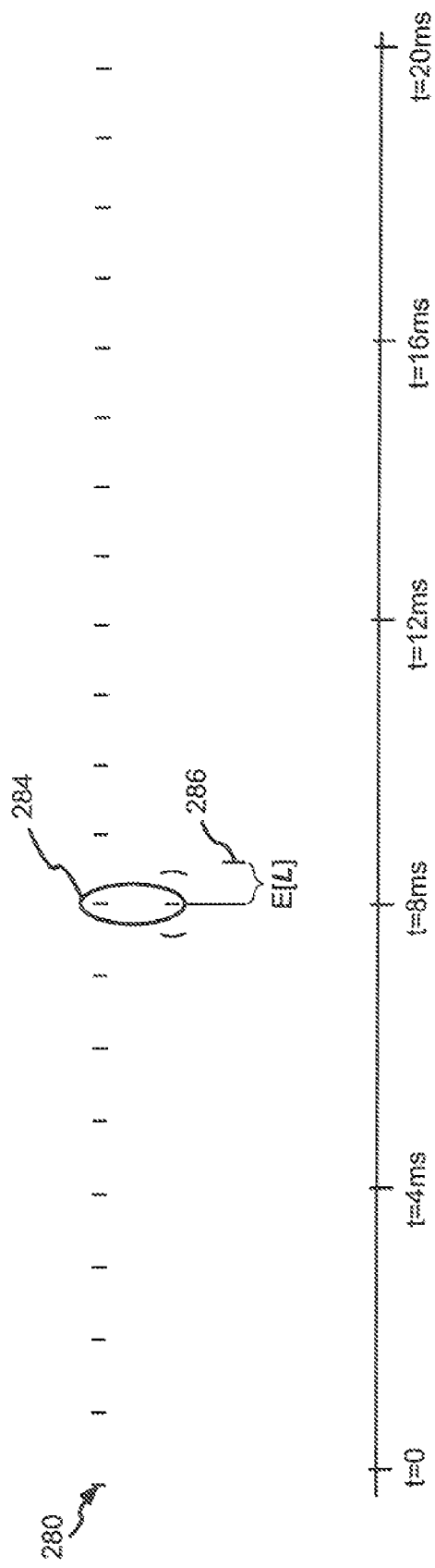
FIG. 5A is a timing diagram illustrating an association of pseudorange hypotheses derived from signals acquired from different SVs according to an alternative feature.

As illustrated in FIG. 5A according to a particular example, once an alignment of the detected code phase relative to the 100 ms data sequence is determined, pseudorange hypotheses 280 of a GPS signal over a 20 ms data bit interval may be associated with a 20 ms segment of the 100 ms data sequence containing a single pseudorange hypotheses 286 by a difference estimate E[L] determined according to relation (1). Again, for the purposes of illustration, a single-sided uncertainty in such a difference estimate is shown as less than 0.5 msec. Here, a single pseudorange hypothesis 284, among pseudorange hypotheses 280, is associated with single pseudorange hypothesis 286. Accordingly, an alignment of a bit edge with respect to a true pseudorange of a received GPS signal may be unambiguously detected in the received data signal. Again in other examples, however, such a single-sided uncertainty of 0.5 msec in the difference estimate E[L] may exceed 0.5 msec, resulting in an association of two or more pseudorange hypotheses. Again, a likelihood function may also be applied for resolving these additional ambiguities.

Figure 5B:
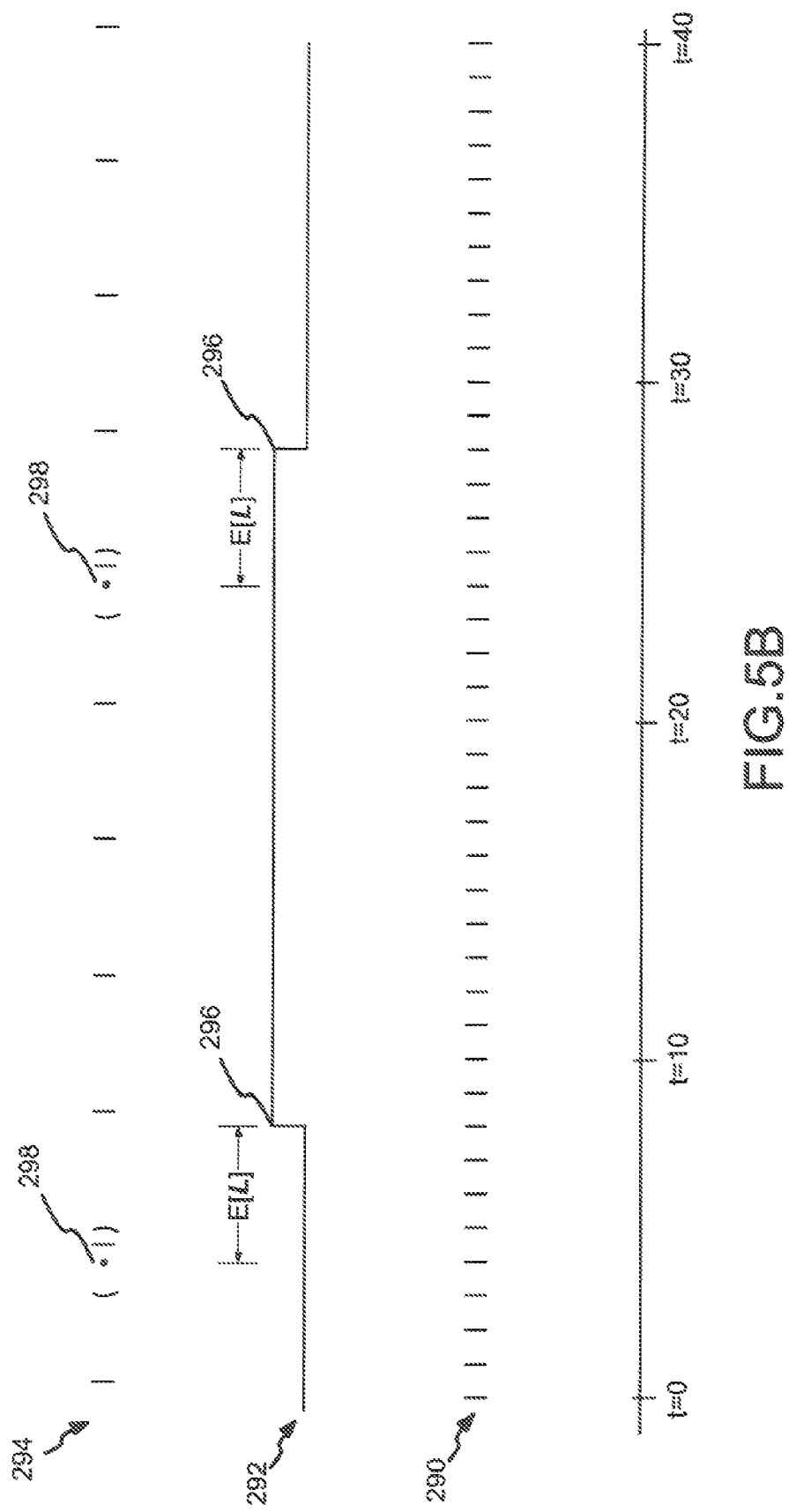
FIG. 5B is a timing diagram illustrating a use of detection of a bit edge of a data signal modulating a first SPS signal in acquisition of a second SPS signal according to an alternative feature.

In another particular example, detection of a bit edge of a data signal modulating a signal received from a GPS SV at a reference location may assist in acquisition of a signal received from a Galileo SV. As illustrated in FIG. 5B, acquired GPS signal 290 comprises 1.0 msec repeating PN code sequences and is modulated by data signal 292 having 20.0 msec bit intervals as illustrated above. Here, it should be observed that any one of such 20.0 msec bit intervals of data signal 292 may associate with five consecutive 4.0 msec repeating PN code sequences of a received Galileo signal 294. Accordingly, by detecting a bit edge of data signal 292, pseudorange hypotheses 296 in the acquired GPS signal may be associated with portions of a received Galileo signal 294 by difference estimate E[L]. In acquiring the Galileo signal, accordingly, a codephase search range may be centered at an instance in the received Galileo signal associated with a pseudorange 296 detected in the acquired GPS signal 292 by difference estimate E[L]. Such a codephase search may then be bounded by an uncertainty associated with difference estimate E[L] (which may be determined according to relation (3) shown below according to a particular example).

According to an example, uncertainty in timing of a navigation signal received from an SV at a reference location may be determined from the following components: uncertainty in the timing of the clock at the receiver; location of the SV relative to the reference location; and uncertainty in the reference location where the navigation signal is being received. Here, a single-sided uncertainty in the timing of a navigation signal received from an SV at a reference location, SV_Tunc, may be expressed according to relation (2) as follows:

$$SV\_Tunc = Clock\_Tunc + [(Punc/c)*cos(SV\_el)] \quad (2)$$

where:
    Clock_Tunc=uncertainty in timing of the clock at the receiver in units of time;
    Punc=single-sided uncertainty in location of receiver from a reference location, in units of length;
    c=speed of light; and
    SV_el=elevation of SV at the reference location.

According to an example, under certain conditions acquisition of a Galileo signal from a first SV at a reference location, and accurate knowledge of timing of the Galileo signal received at the reference location, may assist in acquisition of a GPS signal received from a second SV. Again, as pointed out above, it should be understood that a Galileo signal transmitted from the first SV may be synchronized with a data signal modulating the GPS signal received from the second SV. Further, it should be observed that a 20 msec period of a data signal in a GPS signal received corresponds with five consecutive 4.0 msec epochs of a Galileo signal received. Accordingly, by having sufficient accuracy in the timing of the navigation signal received from the Galileo SV at a reference location as determined in relation (2) above, a navigation receiver may associate a beginning or leading edge of a particular 4.0 msec epoch of the received Galileo signal (from among five such 4.0 msec epochs) with a bit edge in a GPS signal received at the reference location. For example, such a 4.0 msec epoch of the received Galileo signal received at the reference location, which is known to sufficient accuracy, may be associated with a bit edge in a data signal of a GPS signal received at the reference location by difference estimate E[L] as determined above according to relation (1). Since timing of the Galileo signal is received at the reference location with sufficient accuracy, a leading edge of the 4.0 msec epoch may be associated with a bit edge in a GPS signal received at the reference location by a known phase (if applicable) and difference estimate E[L].

Figure 6A:
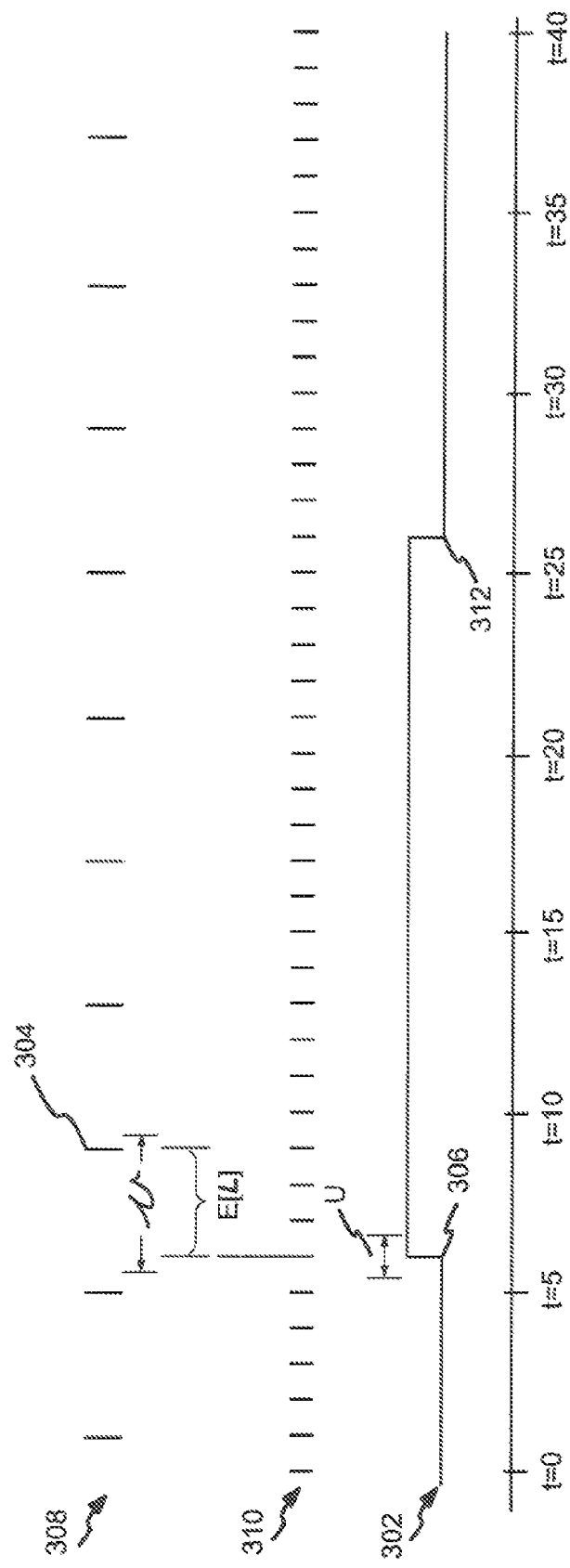
FIG. 6A is a timing diagram illustrating an association of pseudorange hypotheses derived from signals acquired from different SVs according to an alternative feature.

As shown in FIG. 6A, a Galileo signal 308 received from a first SV at a reference location region may comprise 4.0 msec epochs beginning at t=1.0, 5.0, 9.0, 13.0, 17.0, 21.0, 25.0, 29.0, 33.0 and 37.0 msec. A GPS signal received from a second SV at the reference location region is modulated by a repeating PRN code 310 comprising 1.0 msec epochs at t=1.0, 2.0, 3.0, 4.0 5.0, 6.0, 7.0, 8.0, etc. msec. Provided that a single-sided uncertainty in the timing of the Galileo signal as received at the reference location region, as determined according to relation (2) for example, is within 2.0 msec, a receiver may associate a particular leading edge 304 of 4.0 msec epochs, that are within double-sided uncertainty regions $\mu$, with the start of transmission of a particular data epoch from the Galileo SV. Such a start of transmission of a particular data epoch may occur, for example, at the start of a week, start of a data frame, the start of a data segment, etc. Since the transmission of data signals from Galileo may be synchronized to the transmission of data signal from GPS, a receiver may associate a particular leading edge 304 of 4.0 msec Galileo epochs to a particular bit edge 306 of a GPS data signal 302. Here, it should be observed that a difference estimate E[L], as determined according to relation (1) for example, may be used to estimate instances of bit edges 306 with an accuracy based, at least in part, on accuracy of the difference estimate E[L].

As illustrated above, an uncertainty region $\mu$ may be derived from single sided uncertainty region determined according to relation (2). According to an example, an additional uncertainty region U may represent an uncertainty associated with difference estimate E[L]. Referring again to the particular example of FIG. 6A, if such an uncertainty region U is less than 0.5 msec single sided, then phase and/or alignment of a bit edge associated with a leading edge of a particular 1.0 msec PRN epoch on the GPS signal may be uniquely determined. If the uncertainty region U is greater than 0.5 msec single sided, then a precise phase and/or alignment such a bit edge of the GPS SV may still remain somewhat ambiguous. In a particular example, such a single-sided uncertainty in difference estimate E[L] with respect to SV1 and SV2 may be determined according to relation (3) as follows:

$$U = 1/c * Punc * [\{\cos(E2)*\cos(A2) - \cos(E1)*\cos(A1)\}^2 + \{\cos(E2)*\sin(A2) - \cos(E1)*\sin(A1)\}^2]^{1/2} \quad (3)$$

where:
c=speed of light
A1=estimated azimuth angle to SV1 from the reference location;
A2=estimated azimuth angle to SV2 from the reference location;
E1=estimated elevation angle to SV1 from the reference location;
E2=estimated elevation angle to SV2 from the reference location;
and
Punc=single-sided uncertainty in reference location in units of length.

By estimating a location of a bit edge of a data signal modulating a GPS signal received at a reference location as illustrated above, the received GPS signal may be acquired using pre-detection integration (PDI) with enhanced sensitivity. Between bit edges 306 and 312, for example, data signal 302 does not change. Accordingly, PDI may be performed with enhanced sensitivity over a portion of the received GPS signal between estimates of bit edges 306 and 312 which are based, at least in part, on a Galileo signal acquired at the reference location region as described above.

In determining a phase and/or alignment of a bit edge of a GPS data signal received at a reference location region according to an alternative feature, a receiver may obtain additional information from a Galileo signal received at the reference location to permit additional initial uncertainty in timing of the received Galileo signal. In particular, it should be observed that chips in a periodically repeating PN code sequence in a signal from a Galileo SV may be rate ½ Viterbi encoded as a "data channel" where PN code sequences transmitted on 4.0 msec epochs are Viterbi encoded with either a "1" or a "0" on alternating 4.0 ms epochs.

Figure 6B:
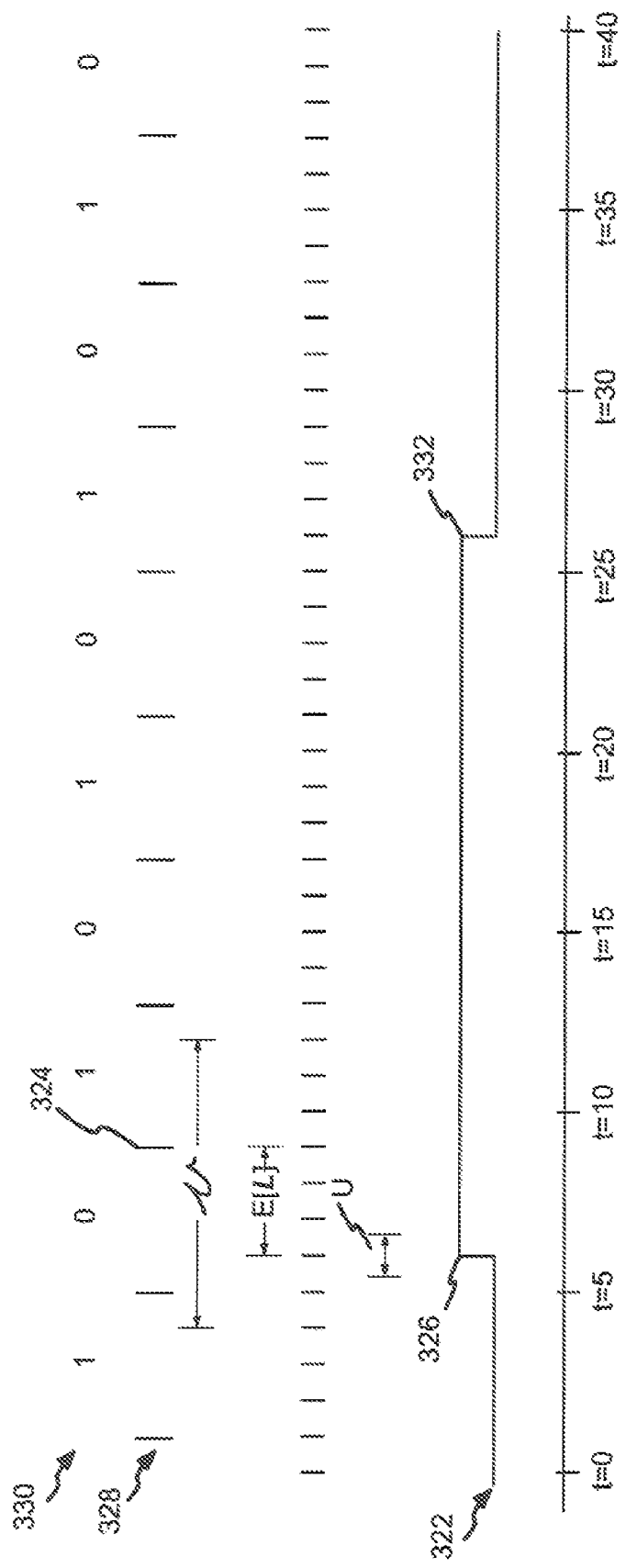
FIG. 6B is a timing diagram illustrating an association of pseudorange hypotheses derived from signals acquired from different SVs according to an alternative feature.

In the example illustrated above, a bit edge of a data signal modulating a GPS signal received at a reference location region is obtained from acquisition of a Galileo signal at the reference location region and knowledge of the timing of the Galileo signal with single-sided uncertainty not exceeding 2.0 msec, and single-sided uncertainty U in a difference estimate E[L] not exceeding 0.5 msec. In an alternative feature, however, Viterbi decoding of the data channel of a Galileo signal received at a reference location may enable detection of a bit edge in a GPS signal received at the reference location where a single-sided uncertainty determined according to relation (2) in timing of the Galileo signal is as high as 4.0 msec. Here, the data signal of the received GPS signal is synchronized with Viterbi encoded 4.0 msec epochs of the Galileo signal. Referring to FIG. 6B, since the received GPS and Galileo signals may be synchronized, bit edge 326 in data signal 322 (of the received GPS signal) may be known to be synchronized with a particular transition in a Viterbi code of the received Galileo signal from a "0" to a "1", for example. In addition, with knowledge of timing of the received Galileo signal with sufficient accuracy, a receiver may determine that such a particular transition from a "0" to a "1" lies within 8.0 msec uncertainty region $\mu$. Accordingly, the receiver may then deduce that transition 324 is associated with the start of transmission of a particular data epoch from the Galileo SV. Again, such a start of transmission may comprise a start of the week, the start of a data frame, the start of a data segment, etc. Since transmission of data signals from Galileo may be synchronized to the transmission of data signal from GPS, a receiver may associate a particular leading edge 324 of 8.0 msec Galileo epochs with a particular bit edge 326 of a data signal 322 modulating a GPS signal by difference estimate E[L], and the single-sided uncertainty U in a difference estimate E[L] does not exceed 0.5 msec. Accordingly, as illustrated above, PDI may be performed over a portion of the received GPS signal for acquisition with enhanced sensitivity between estimates of bit edges 326 and 332 which are based, at least in part, on a Galileo signal acquired at the reference location as described above.

For the purpose of illustration, FIG. 6B shows a data channel 330 of a Viterbi encoded data channel as having values "1" and "0" in alternating 4.0 msec epochs. It should be understood, however, that such values may not necessarily alternate on consecutive 4.0 msec epochs, and that claimed subject matter is not limited in this respect.

Figure 6C:
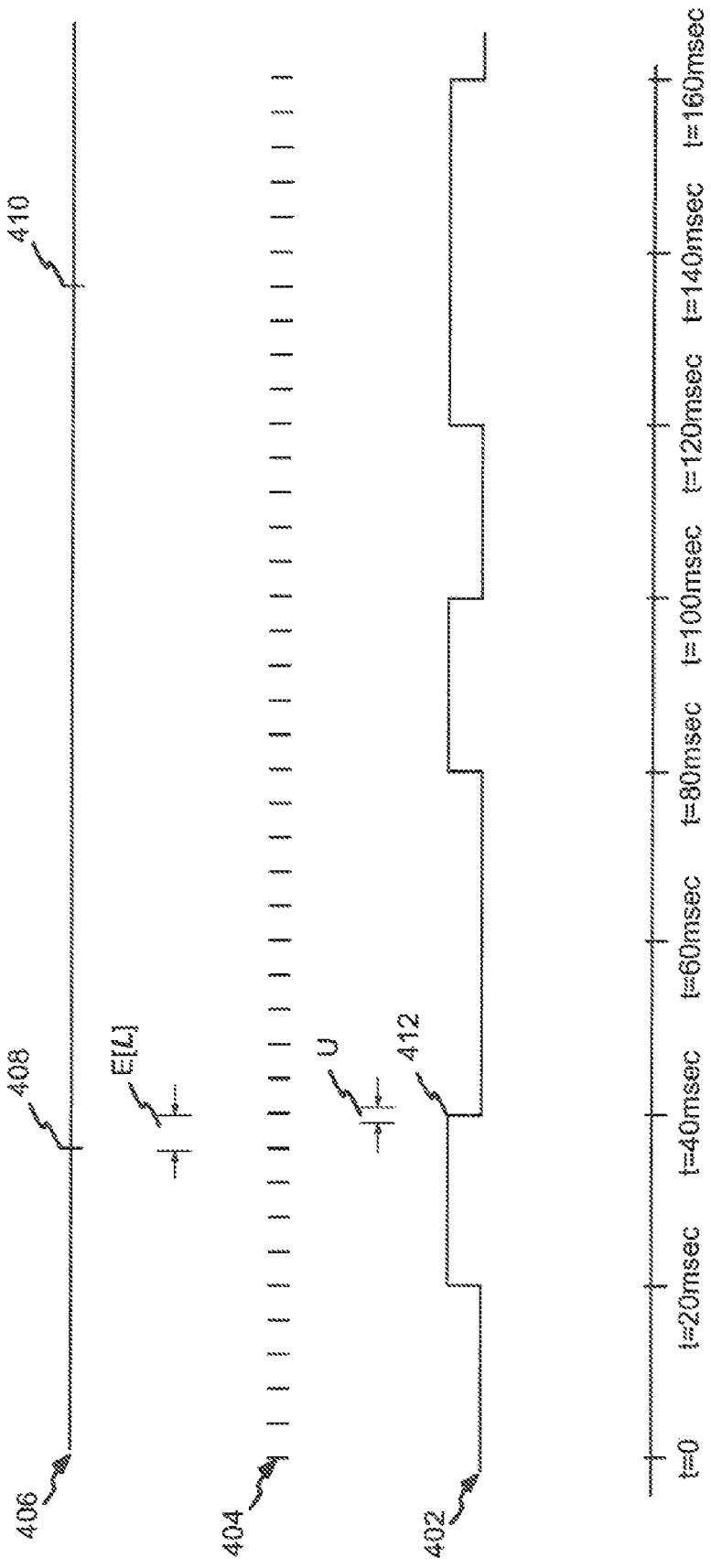
FIG. 6C is a timing diagram illustrating an association of pseudorange hypotheses derived from signals acquired from different SVs according to an alternative feature.

In yet another alternative feature, a GPS receiver may employ information extracted from a pilot channel of a Galileo signal acquired at the reference location in determining a phase and/or alignment of a bit edge of a GPS data signal received at a reference location. As illustrated in FIG. 6C, such a pilot channel 406 of a Galileo signal may be encoded with a known data sequence that repeats on 100 ms periods overlapping twenty-five consecutive 4.0 msec epochs of repeating PRN sequence 404. Here, a data signal 402 of a received GPS signal may be synchronized with pilot channel 406. Also, it should be observed that a 100 msec period of pilot channel 406 received at a reference location may be associated with five consecutive 20 msec periods of data signal 402. Having a single-sided uncertainty determined according to relation (2) in timing of the received Galileo signal of less than 50 msec (or an uncertainty region of less than 100 msec) enables an association of an instance of a 100 msec period of the decoded pilot channel with the start of transmission of a particular data epoch from the Galileo SV, such as the start of transmission at the start of the week, the start of a data frame, the start of a data segment, etc. Since the transmission of pilot channel 406 may be synchronized to the transmission of data signal 402, a receiver may associate a particular leading edge 408 of 100.0 msec epochs of pilot channel 406 to a particular bit edge 412 in data signal 402 of the received GPS signal. Accordingly, a known instance in a 100 msec period of a detected pilot channel in a received Galileo signal may be associated with a bit edge of the received GPS signal by a difference estimate E[L] determined according to relation (1), and the single-sided uncertainty U in a difference estimate E[L] does not exceed 0.5 msec. Again, with determination of the bit edge in the received GPS signal, PDI may be performed over a portion of the received GPS signal for acquisition of the GPS signal with enhanced sensitivity between estimates of bit edges.

Figure 6D:
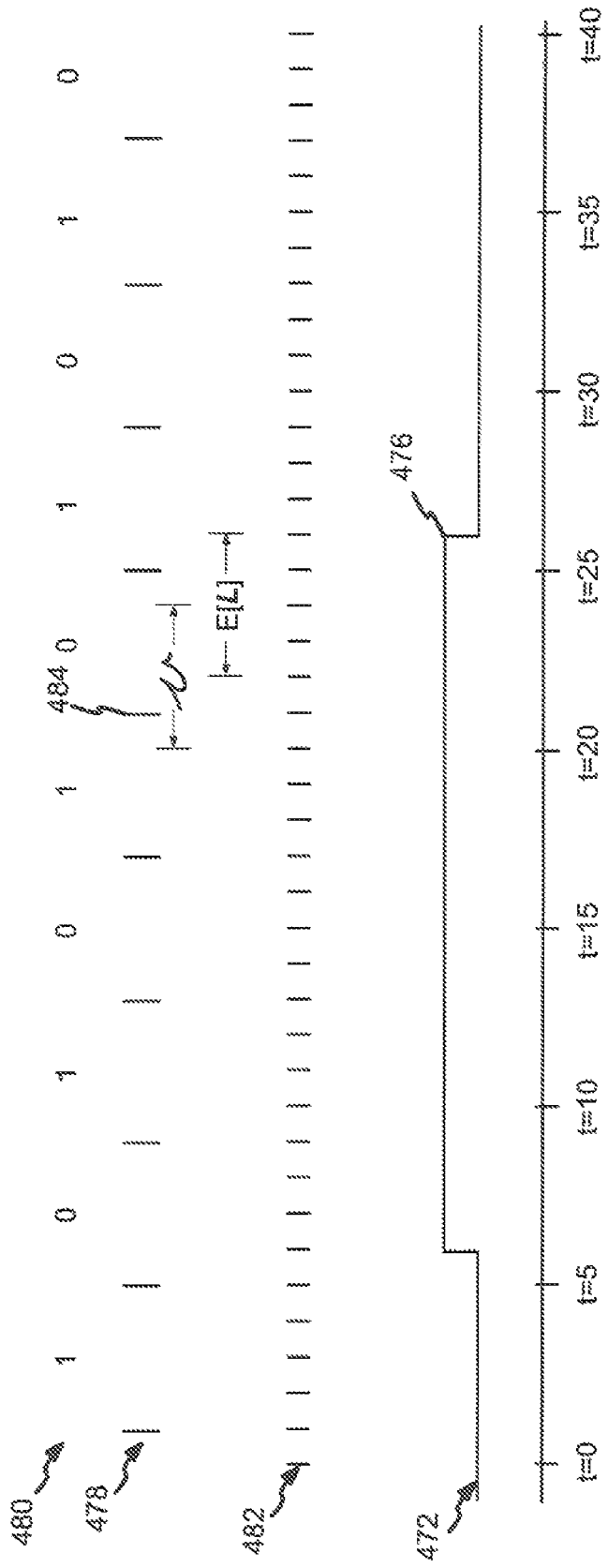
FIG. 6D is a timing diagram illustrating an association of pseudorange hypotheses derived from signals acquired from different SVs according to an alternative feature.

According to an example, although claimed subject matter is not limited in this respect, detection of a bit edge in a GPS signal received at a reference location may be used to determine viterbi encoding boundaries of a Galileo signal received at the reference location. As illustrated above, a particular bit edge in a data signal of the received GPS signal may be known to be synchronized with a transition in a Viterbi code of the received Galileo signal from a "0" to a "1" or synchronized with a transition from "1" to "0", for example. As such, with a single-sided uncertainty determined according to relation (2) in timing of the received GPS signal of less than 10 msec, it should be observed that the particular detected bit edge in the data signal of the received GPS signal may be associated with such a transition (Viterbi decoding boundary) in the data channel of the received Galileo signal by difference estimate E[L] determined according to relation (1) above, if the difference uncertainty in the estimate E[L] from the GPS SV to the Galileo SV is less than 2.0 msec. The difference uncertainty is determined according to relation (3) above. As illustrated in FIG. 6D, for example, with a single-sided uncertainty in timing of the received GPS signal of less than 10 msec, detection of bit edge 476 in data signal 472 modulating GPS signal 482 received at a reference location provides an accurate time reference to Viterbi encoded Galileo signal 478 received at the reference location. With a two-sided uncertainty μ of less than 4.0 msec as shown, accordingly, a transition in a Viterbi encoding boundary 484 in Galileo signal 478 may be uniquely determined.

According to an example, an SV visible at a receiver (e.g., as indicated in an AA message) may be associated with a particular set of search window parameters defining a two-dimensional domain of code phase and Doppler frequency hypotheses to be searched for the SV. In one implementation, illustrated in FIG. 7, search window parameters for an SV comprise a code phase search window size, WIN_SIZE$_{CP}$, a code phase window center, WIN_CENT$_{CP}$, a Doppler search window size, WIN_SIZE$_{DOPP}$, and a Doppler window center, WIN_CENT$_{DOPP}$. In the case where the entity whose position is sought to be determined is a subscriber station in an IS-801 compliant wireless communication system, these parameters may be indicated by an AA message provided to the subscriber station by a PDE.

Figure 7:
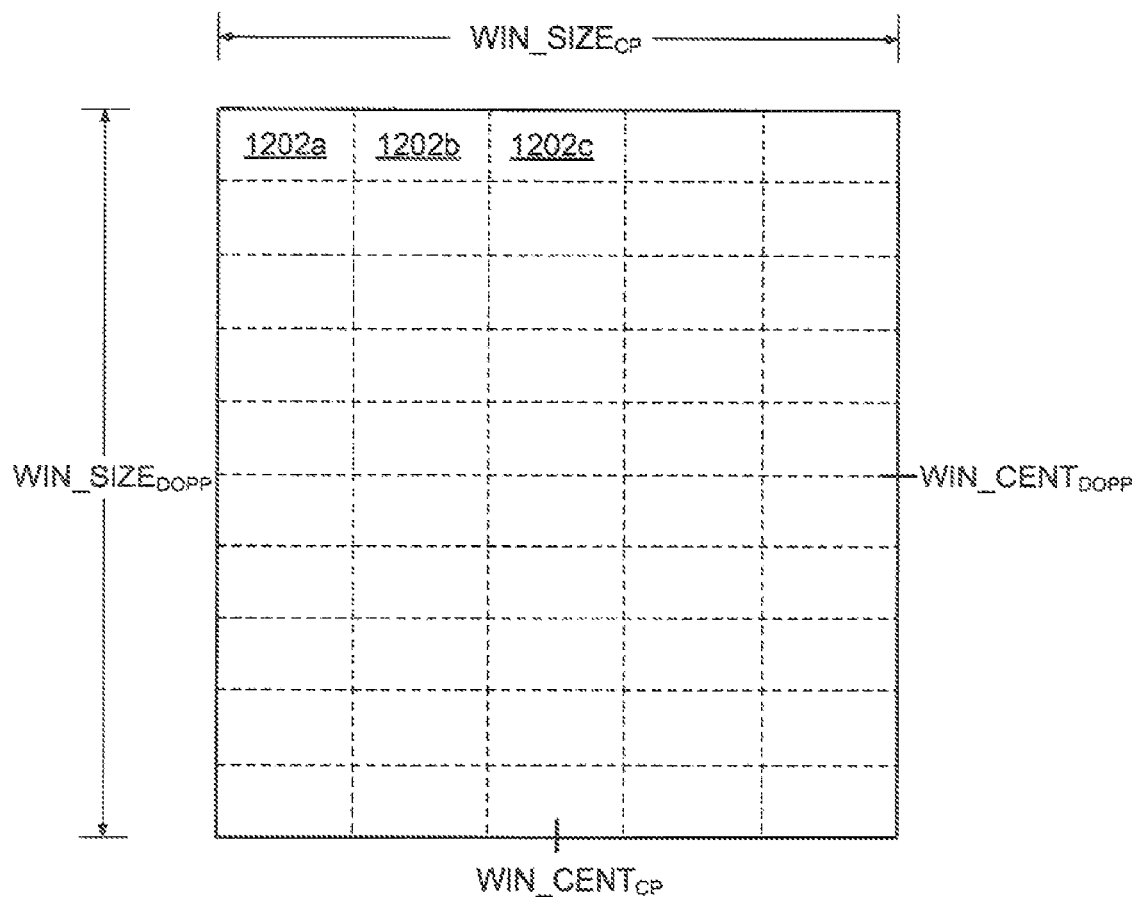
FIG. 7 is a schematic diagram of a two-dimensional domain to be searched for detection of a signal transmitted from a space vehicle according to one aspect.

The two-dimensional search space for an SV illustrated in FIG. 7 shows a code phase axis is a horizontal axis, and a Doppler frequency axis as a vertical axis, but this assignment is arbitrary and could be reversed. The center of the code phase search window is referred to as WIN_CENT$_{CP}$, and the size of the code phase search window is referred to as WIN_SIZE$_{CP}$. The center of the Doppler frequency search window is referred to as WIN_CENT$_{DOPP}$, and the size of the Doppler frequency search window is referred to as WIN_SIZE$_{DOPP}$.

Following acquisition of a first signal from a first SV, according to an example, WIN_CENT$_{CP}$, and WIN_SIZE$_{CP}$ for acquisition of a second signal from a second SV may be determined based, at least in part, on a code phase detected in the first acquired signal, an estimate of receiver location and information descriptive of locations for the first and second SVs for a particular time t. Here, a search space for acquiring the second signal may be partitioned into a plurality of segments 1202a, 1202b, 1202c, each of which is characterized by a range of Doppler frequencies and a range of code phases.

According to an example, a range of code phases characterizing a segment may be equal to the capacity of a channel of a correlator to search of the segment through a single channel pass. In one particular example where the channel capacity is thirty-two chips, for example, a range of code phases characterizing a segment may be likewise thirty-two chips, but it should be appreciated that other examples are possible.

Figure 8:
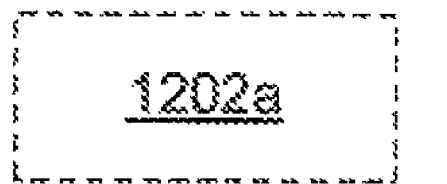
FIG. 8 illustrates an overlap by a prescribed number of chips in a search window to avoid missing peaks that appear at segment boundaries according to one aspect.
Figure 8:
Figure 8:
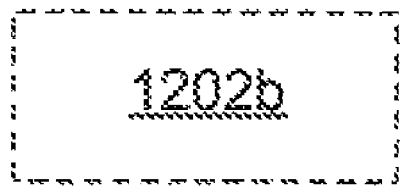
Figure 8:
Figure 8:
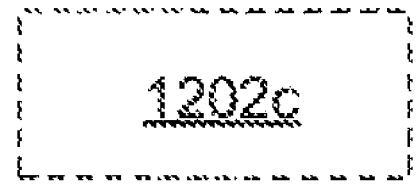

Segments may be caused to overlap by a prescribed number of chips to avoid missing peaks that appear at segment boundaries as illustrated in FIG. 8. Here, a tail end of segment 1202a overlaps the front end of segment 1202b by Δ chips, and the tail end of segment 1202b likewise overlaps the front end of segment 1202c by Δ chips. Because of the overhead due to this overlap, an effective range of code phases represented by a segment may be less than the channel capacity. In the case where the overlap is four chips, for example, an effective range of code phases represented by a segment may be twenty-eight chips.

Figure 9:
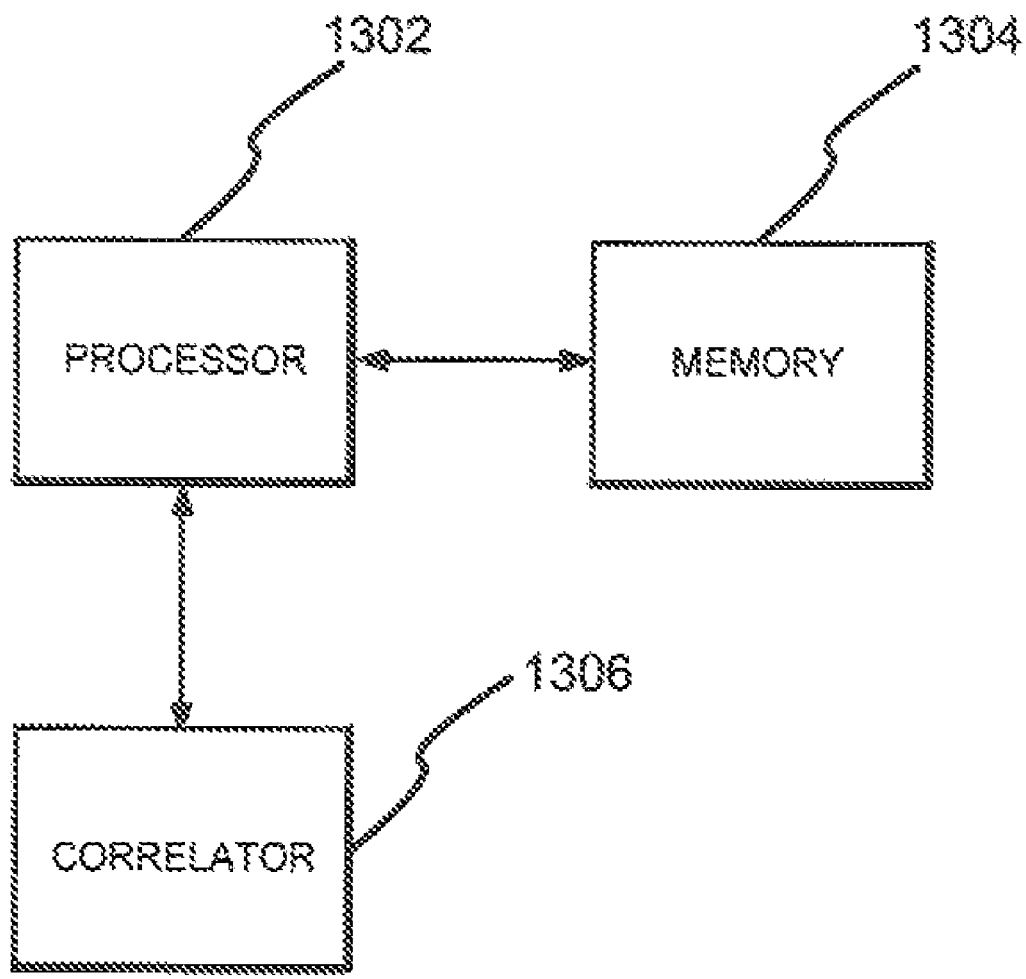
FIG. 9 is a schematic diagram of a system for processing signals to determine a position location according to one aspect.

A system for acquiring periodically repeating signals from SVs is illustrated in FIG. 9 according to a particular example. However, this is merely an example of a system that is capable of acquiring such signals according to a particular example and other systems may be used without deviating from claimed subject matter. As illustrated in FIG. 9 according to a particular example, such a system may comprise a computing platform including a processor 1302, memory 1304, and correlator 1306. Correlator 1306 may be adapted to produce correlation functions from signals provided by a receiver (not shown) to be processed by processor 1302, either directly or through memory 1304. Correlator 1306 may be implemented in hardware, software, or a combination of hardware and software. However, these are merely examples of how a correlator may be implemented according to particular aspects and claimed subject matter is not limited in these respects.

According to an example, memory 1304 may store machine-readable instructions which are accessible and executable by processor 1302 to provide at least a portion of a computing platform. Here, processor 1302 in combination with such machine-readable instructions may be adapted to perform all or portions of process 200 illustrated above with reference to FIG. 3. In a particular example, although claimed subject matter is not limited in these respects, processor 1302 may direct correlator 1306 to search for position determination signals as illustrated above and derive measurements from correlation functions generated by correlator 1306.

Figure 10:
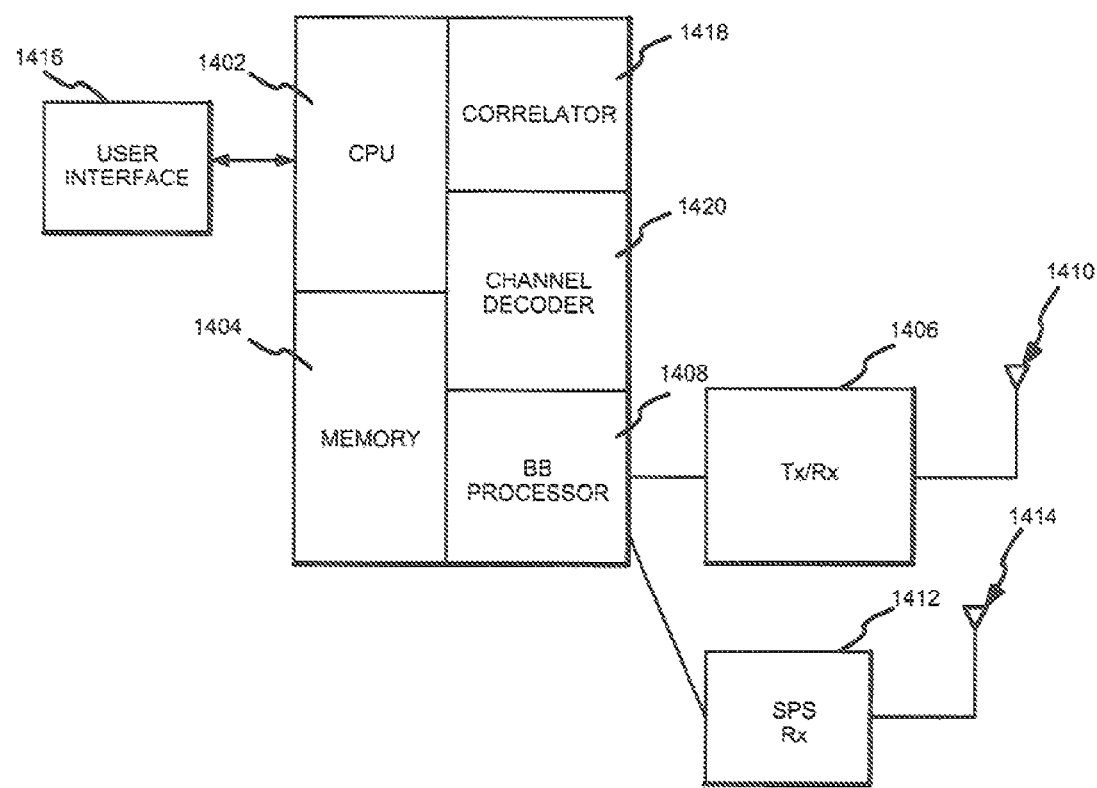
FIG. 10 is a schematic diagram of a subscriber station according to one aspect.

Returning to FIG. 10, radio transceiver 1406 may be adapted to modulate an RF carrier signal with baseband information, such as voice or data, onto an RF carrier, and demodulate a modulated RF carrier to obtain such baseband information. An antenna 1410 may be adapted to transmit a modulated RF carrier over a wireless communications link and receive a modulated RF carrier over a wireless communications link.

Baseband processor 1408 may be adapted to provide baseband information from CPU 1402 to transceiver 1406 for transmission over a wireless communications link. Here, CPU 1402 may obtain such baseband information from an input device within user interface 1416. Baseband processor 1408 may also be adapted to provide baseband information from transceiver 1406 to CPU 1402 for transmission through an output device within user interface 1416.

User interface 1416 may comprise a plurality of devices for inputting or outputting user information such as voice or data. Such devices may include, for example, a keyboard, a display screen, a microphone, and a speaker.

SPS receiver (SPS Rx) 1412 may be adapted to receive and demodulate transmissions from SVs, and provide demodulated information to correlator 1418. Correlator 1418 may be adapted to derive correlation functions from the information provided by receiver 1412. For a given PN code, for example, correlator 1418 may produce a correlation function defined over a range of code phases to set out a code phase search window, and over a range of Doppler frequency hypotheses as illustrated above. As such, an individual correlation may be performed in accordance with defined coherent and non-coherent integration parameters.

Correlator 1418 may also be adapted to derived pilot-related correlation functions from information relating to pilot signals provided by transceiver 1406. This information may be used by a subscriber station to acquire wireless communications services.

Channel decoder 1420 may be adapted to decode channel symbols received from baseband processor 1408 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1420 may comprise a turbo decoder.

Memory 1404 may be adapted to store machine-readable instructions which are executable to perform one or more of processes, examples, implementations, or examples thereof which have been described or suggested. CPU 1402 may be adapted to access and execute such machine-readable instructions. Through execution of these machine-readable instructions, CPU 1402 may direct correlator 1418 to perform search employing particular search modes at blocks 202 and 204, analyze the GPS correlation functions provided by correlator 1418, derive measurements from the peaks thereof, and determine whether an estimate of a location is sufficiently accurate. However, these are merely examples of tasks that may be performed by a CPU in a particular aspect and claimed subject matter in not limited in these respects.

In a particular example, CPU 1402 at a subscriber station may estimate a location the subscriber station based, at least in part, on signals received from SVs as illustrated above. CPU 1402 may also be adapted to determine a code search range for acquiring a second received signal based, at least in part, on a code phase detected in a first received signals as illustrated above according to particular examples. It should be understood, however, that these are merely examples of systems for estimating a location based, at least in part, on pseudorange measurements, determining quantitative assessments of such pseudorange measurements and terminating a process to improve accuracy of pseudorange measurements according to particular aspects, and that claimed subject matter is not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method comprising:
 associating first pseudorange hypotheses derived from a first signal acquired from a first space vehicle (SV) at a reference location with one or more second pseudorange hypotheses derived from a second signal received from a second SV at said reference location, said associating being based, at least in part, on an estimated difference between a first range to said first SV from said reference location and a second range to said second SV from said reference location; and
 reducing an ambiguity of a phase of a bit edge of a data signal modulating said first signal based, at least in part, on said associated first pseudorange hypotheses, wherein said first signal is transmitted according to a first format and said second signal is transmitted according to a second format different from said first format.

2. The method of claim 1, and further comprising determining said estimated difference based, at least in part, on locations of said first and second SVs.

3. The method of claim 2, and further comprising receiving information indicative of the locations of said first and second SVs obtained from an acquisition assistance message.

4. The method of claim 1, wherein said second signal is encoded with a repeating data sequence, and wherein said method further comprises:
 decoding said repeating data sequence from at least a portion of said second signal; and
 eliminating at least some of said second pseudorange hypotheses based, at least in part, on said decoded data sequence.

5. The method of claim 4, wherein said reducing said ambiguity further comprises:
 limiting said associated first pseudorange hypotheses to first pseudorange hypotheses associated with any remaining second pseudorange hypotheses following said eliminating.

6. The method of claim 1, wherein said second signal is encoded with a known data sequence, and wherein said method further comprises:
 detecting a phase alignment of said known data sequence relative to a true pseudorange to said second SV, and wherein said associating further comprises associating said true pseudorange to said second SV with said first pseudorange hypotheses.

7. A method comprising:
 associating first pseudorange hypotheses derived from a first signal acquired from a first space vehicle (SV) at a reference location with one or more second pseudorange hypotheses derived from a second signal received from a second SV at said reference location, said associating being based, at least in part, on an estimated difference between a first range to said first SV from said reference location and a second range to said second SV from said reference location; and reducing an ambiguity of a phase of a bit edge of a data signal modulating said first signal based, at least in part, on said associated first pseudorange hypotheses, wherein said first SV comprises a satellite in a GPS constellation and said second SV comprises a satellite in a Galileo constellation.

8. A method comprising:

determining a plurality of first pseudorange hypotheses to a first space vehicle (SV) from a reference location based, at least in part, on a first code phase detected in a first signal received at said reference location, said first signal being modulated by a data signal; and reducing an ambiguity associated with a true pseudorange among said first pseudorange hypotheses with respect to said data signal based, at least in part, on a second code phase detected in a second signal received from a second SV at said reference location, wherein said first signal is transmitted according to a first format and second signal is transmitted according to a second format different from said first format.

9. The method of claim 8, wherein said second signal is encoded with a periodically repeating random code sequence, and wherein, said reducing said ambiguity further comprises:

determining one or more second pseudorange hypotheses to said second SV from said reference location based, at least in part, on said second code phase; and associating said first hypotheses with said second hypotheses.

10. The method of claim 9, wherein said associating said first hypotheses with said second hypotheses further comprises associating said first hypotheses with said second hypotheses based, at least in part, on an estimate of a difference between a range to said first SV from said reference location and a range to said second SV from said reference location.

11. The method of claim 10, wherein said estimate is based, at least in part, on locations of said SVs.

12. The method of claim 9, wherein said second signal is modulated with information, and wherein said reducing said ambiguity further comprises eliminating said second pseudorange hypotheses based, at least in part, on said information.

13. The method of claim 12, wherein said information comprises a periodically repeating data sequence.

14. The method of claim 13, wherein said information comprises a Galileo pilot channel.

15. The method of claim 8, wherein said first SV is of a GPS constellation and said second SV is of a Galileo constellation.

16. A method comprising:

determining a plurality of first pseudorange hypotheses to a first space vehicle (SV) from a reference location based, at least in part, on a first code phase detected in a first signal received at said reference location, said first signal being modulated by a data signal; and reducing an ambiguity associated with a true pseudorange among said first pseudorange hypotheses with respect to said data signal based, at least in part, on a second code phase detected in a second signal received from a second SV at said reference location, wherein said first signal is transmitted according to a first GNSS and second signal is transmitted according to a second GNSS different from said first GNSS.

17. A method comprising:

receiving a first space vehicle (SV) signal from a first satellite positioning system; and reducing a bit edge ambiguity of a data signal modulating a second SV signal received from a second satellite positioning system based, at least in part, on information in said received first SV signal.

18. The method of claim 17, wherein said information comprises a code phase detected in said first SV signal.

19. The method of claim 18, wherein said reducing said bit edge ambiguity further comprises:

determining one or more first pseudorange hypotheses based, at least in part, on said code phase; and associating said one or more first pseudorange hypotheses with a plurality of second pseudorange hypotheses associated with said second SV signal.

20. An article comprising:

a storage medium, said storage medium comprising machine-readable instructions stored thereon executable by a computing platform to:

associate first pseudorange hypotheses derived from a first signal acquired from a first space vehicle (SV) at a reference location with one or more second pseudorange hypotheses derived from a second signal received from a second SV at said reference location, said association between said first and second pseudorange hypotheses being based, at least in part, on an estimated difference between a first range to said first SV from said reference location and a second range to said second SV from said reference location; and reduce an ambiguity of a phase of a bit edge of a data signal modulating said first signal based, at least in part, on said associated first pseudorange hypotheses, wherein said first signal is transmitted according to a first format and second signal is transmitted according to a second format different from said first format.

21. An article comprising:

a storage medium, said storage medium comprising machine-readable instructions stored thereon executable by a computing platform to:

determine a plurality of first pseudorange hypotheses to said first space vehicle (SV) from a reference location based, at least in part, on a first code phase detected in a first signal received at said reference location, said first signal being modulated by a data signal; and reduce an ambiguity associated with a true pseudorange among said first pseudorange hypotheses with respect to said data signal based, at least in part, on a second code phase detected in a second signal received from a second SV at said reference location, wherein said first signal is transmitted according to a first format and second signal is transmitted according to a second format different from said first format.

22. An article comprising:

a storage medium, said storage medium comprising machine-readable instructions stored thereon executable by a computing platform to:

obtain information based, at least in part, on a first space vehicle (SV) signal received from a first satellite positioning system; and reduce a bit edge ambiguity of a data signal modulating a second SV signal received from a second satellite positioning system based, at least in part, on information in said received first SV signal.

23. The article of claim 22, wherein said information comprises a code phase detected in said first SV signal.

24. The article of claim 23, said machine-readable instructions executable by a computing platform to further:

determine one or more first pseudorange hypotheses based, at least in part, on said code phase; and associate said one or more first pseudorange hypotheses with a plurality of second pseudorange hypotheses associated with said second SV signal.

25. A subscriber unit comprising:
a receiver to receive an acquisition assistance (AA) message comprising information indicative of locations of first and second space vehicles (SVs); and
a processor to access said information indicative of said locations and to:
   estimate a difference between a first range to said first SV from a reference location and a second range to said second SV from said reference location based, at least in part, on said information;
   associate, based at least in part on said estimated difference, first pseudorange hypotheses derived from a first signal acquired from said first SV at a reference location with one or more second pseudorange hypotheses derived from a second signal acquired from said second SV at said reference location; and
   reduce an ambiguity of a phase of a bit edge of a data signal modulating said first signal based, at least in part, on said associated first pseudorange hypotheses, wherein said first signal is transmitted according to a first format and second signal is transmitted according to a second format different from said first format.

26. The subscriber unit of claim 25, said receiver to receive said AA message over a terrestrial wireless communication link.

27. A subscriber unit comprising:
a receiver to receive an acquisition assistance (AA) message comprising information indicative of locations of first and second space vehicles (SVs); and
a processor to access said information indicative of said locations and to:
   determine a plurality of first pseudorange hypotheses based, at least in part, on a first code phase detected in said first signal, said first signal being modulated by a data signal; and
   reduce an ambiguity associated with a true pseudorange among said first pseudorange hypotheses with respect to said data signal based, at least in part, on said information and a second code phase detected in said second signal, wherein said first signal is transmitted according to a first format and second signal is transmitted to a second format different from said first format.

28. The subscriber unit of claim 27, said receiver to receive said AA message over a terrestrial wireless communication link.

29. A subscriber unit comprising:
a receiver to receive an acquisition assistance (AA) message comprising information indicative of locations of first and second space vehicle (SVs); and
a processor to access said information indicative of said locations and receive first and second SV signals, and reduce a bit edge ambiguity of a data signal modulating said second received SV signal based, at least in part, on information in said received first SV signal and said information indicative of said locations, wherein said received first signal is transmitted according to a first format and said received second signal is transmitted according to a second format different from said first format.

30. The subscriber unit of claim 29, said receiver receive said AA message over a terrestrial wireless communication link.

31. A system comprising:
a position determination entity (PDE); and
a subscriber unit to:
   receive an acquisition assistance (AA) message from said PDE over a terrestrial wireless communication link, said AA message comprising information indicative of locations of first and second space vehicles (SVs);
   estimate a difference between a first range from a reference location to said first SV and a second range from said reference location to said second SV based, at least in part, on said information;
   associate, based at least in part on said estimated difference, first pseudorange hypotheses derived from a first signal acquired from said first SV at a reference location with one or more second pseudorange hypotheses derived from a second signal received from said second SV at said reference location; and
   reduce an ambiguity of an alignment of a true pseudorange to said first SV relative to a bit edge of a data signal modulating said first signal based, at least in part, on said associated first pseudorange hypotheses, wherein said first signal is transmitted according to a first format and said second signal is transmitted according to a second format different from said first format.

32. A system comprising:
a position determination entity (PDE); and
a subscriber unit to:
   receive an acquisition assistance (AA) message from said PDE over a terrestrial wireless communication link, said AA message comprising information indicative of locations of first and second space vehicles (SVs);
   determine a plurality of first pseudorange hypotheses to said first space vehicle (SV) from a reference location based, at least in part, on a first code phase detected in a first signal received at said reference location, said first signal being modulated by a data signal; and
   reduce an ambiguity associated with an alignment of a true pseudorange among said first pseudorange hypotheses with respect to said data signal based, at least in part, on a second code phase detected in a second signal received from a second SV at said reference location, wherein said first signal is transmitted according to a first format and second signal is transmitted according to a second format different from said first format.

33. A system comprising:
a position determination entity (PDE); and
a subscriber unit to:
   receive an acquisition assistance (AA) message from said PDE over a terrestrial wireless communication link, said AA message comprising information indicative of locations of first and second space vehicles (SVs), said first SV being from a first satellite positioning system (SPS) and a second SV being from a second SPS;
   receive a first SV signal from said first SV and a second SV signal from said second SV; and
   reduce a bit edge ambiguity of a data signal modulating said second received SV signal based, at least in part, on information in said first received SV signal and said information indicative of said locations of said first and second SVs, wherein said first signal is transmitted according to a first format and second signal is transmitted according to a second format different from said first format.

34. An apparatus comprising:
means for receiving an acquisition assistance (AA) message comprising information indicative of locations of first and second space vehicles (SVs), said apparatus further comprising:
means for estimating a difference between a first range to said first SV from a reference location and a second range to said second SV from said reference location based, at least in part, on said information;
means for associating, based at least in part on said estimated difference, first pseudorange hypotheses derived from a first signal acquired from said first SV at a reference location with one or more second pseudorange hypotheses derived from a second signal acquired from said second SV at said reference location; and
means for reducing an ambiguity of a phase of a bit edge of a data signal modulating said first signal based, at least in part, on said associated first pseudorange hypotheses, wherein said first signal is transmitted according to a first format and second signal is transmitted according to a second format different from said first format.

35. The apparatus of claim 34, wherein said means for receiving is further adapted to receive said AA message over a terrestrial wireless communication link.

36. An apparatus comprising:
means for receiving a first space vehicle (SV) signal from a first satellite positioning system; and
means for reducing a bit edge ambiguity of a data signal modulating a second SV signal received from a second satellite positioning system based, at least in part, on information in said received first SV signal.

37. The apparatus of claim 36, wherein said information comprises a code phase detected in said first SV signal.

38. The apparatus of claim 37, further comprising:
means for determining one or more first pseudorange hypotheses based, at least in part, on said code phase; and
means for associating said one or more first pseudorange hypotheses with a plurality of second pseudorange hypotheses associated with said second SV signal.

39. An apparatus comprising:
a receiver to obtain a first space vehicle (SV) signal from a first satellite positioning system; and
a processor to reduce a bit edge ambiguity of a data signal modulating a second SV signal obtained from a second satellite positioning system based, at least in part, on information in said received first SV signal.

40. The apparatus of claim 39, wherein said information comprises a code phase detected in said first SV signal.

41. The apparatus of claim 40, the processor to further:
determine one or more first pseudorange hypotheses based, at least in part, on said code phase; and
associate said one or more first pseudorange hypotheses with a plurality of second pseudorange hypotheses associated with said second SV signal.

42. An article comprising:
a storage medium, said storage medium comprising machine-readable instructions stored thereon executable by a computing platform to:
associate first pseudorange hypotheses derived from a first signal acquired from a first space vehicle (SV) at a reference location with one or more second pseudorange hypotheses derived from a second signal received from a second SV at said reference location, said association between said first and second pseudorange hypotheses being based, at least in part, on an estimated difference between a first range to said first SV from said reference location and a second range to said second SV from said reference location; and
reduce an ambiguity of a phase of a bit edge of a data signal modulating said first signal based, at least in part, on said associated first pseudorange hypotheses, wherein said first SV comprises a satellite in a GPS constellation and said second SV comprises a satellite in a Galileo constellation.

43. An apparatus comprising:
means for associating first pseudorange hypotheses derived from a first signal acquired from a first space vehicle (SV) at a reference location with one or more second pseudorange hypotheses derived from a second signal received from a second SV at said reference location, said association between said first and second pseudorange hypotheses being based, at least in part, on an estimated difference between a first range to said first SV from said reference location and a second range to said second SV from said reference location; and
means for reducing an ambiguity of a phase of a bit edge of a data signal modulating said first signal based, at least in part, on said associated first pseudorange hypotheses, wherein said first SV comprises a satellite in a GPS constellation and said second SV comprises a satellite in a Galileo constellation.

44. An apparatus comprising:
a processor to:
associate first pseudorange hypotheses derived from a first signal acquired from a first space vehicle (SV) at a reference location with one or more second pseudorange hypotheses derived from a second signal received from a second SV at said reference location, said association between said first and second pseudorange hypotheses being based, at least in part, on an estimated difference between a first range to said first SV from said reference location and a second range to said second SV from said reference location, and
reduce an ambiguity of a phase of a bit edge of a data signal modulating said first signal based, at least in part, on said associated first pseudorange hypotheses, wherein said first SV comprises a satellite in a GPS constellation and said second SV comprises a satellite in a Galileo constellation.

* * * * *